United States Patent [19]
Elliott, Jr.

[11] 3,949,059
[45] Apr. 6, 1976

[54] PROCESS FOR PRODUCING FAUJASITIC-TYPE CRYSTALLINE ZEOLITES
[75] Inventor: Curtis H. Elliott, Jr., Baltimore, Md.
[73] Assignee: W. R. Grace & Co., Columbia, Md.
[22] Filed: Oct. 10, 1973
[21] Appl. No.: 405,218

Related U.S. Application Data
[62] Division of Ser. No. 140,249, May 4, 1971, Pat. No. 3,789,107.

[52] U.S. Cl. ............................................... 423/329
[51] Int. Cl.² ......................................... C01B 33/28
[58] Field of Search .......... 423/329, 328, 330, 118; 253/455 Z

[56] References Cited
UNITED STATES PATENTS

| 2,882,244 | 4/1959 | Milton | 423/328 |
| 3,130,007 | 4/1964 | Breck | 423/328 |
| 3,574,538 | 4/1971 | McDaniel et al. | 423/329 |
| 3,733,390 | 5/1973 | Robson | 423/118 |
| 3,849,463 | 11/1974 | Dwyer et al. | 423/328 X |

FOREIGN PATENTS OR APPLICATIONS
1,218,883  1/1971  United Kingdom............... 423/328

*Primary Examiner*—Edward J. Meros
*Attorney, Agent, or Firm*—Kenneth E. Prince; Arthur P. Savage

[57] ABSTRACT

Faujasitic-type crystalline zeolites X and Y are produced. In one embodiment, sodium sulfide is added to the reaction mixture as a source of sodium and as a buffer. The buffering action of the sodium sulfide provides the basicity required to maintain the alumina hydrate component of the reaction mixture in solution but not a basicity whereby zeolite crystallization is retarded. In another embodiment, a nucleating mixture having the formula 3–10 $Na_2S$: 5–15 $Na_2O$: 5–50 $SiO_2$: 0.4–4.0 $Al_2O_3$: 50–500 $H_2O$ is added to the reaction mixture to promote crystalline zeolite formation.

5 Claims, No Drawings

PROCESS FOR PRODUCING FAUJASITIC-TYPE CRYSTALLINE ZEOLITES

This application is a divisional of U.S. application Ser. No. 140,249, filed May 4, 1971, now U.S. Pat. No. 3,789,107.

This invention relates to zeolite X and zeolite Y molecular sieves produced using a sulfide as a principal reactant. This invention further relates to a sodium sulfide containing nucleating mixture which provides nucleation or seeding centers for the crystallization of ten angstrom molecular sieves.

The molecular siever to which this invention is directed are crystalline zeolite molecular sieves having an effective pore diameter of 10 angstroms. Such 10 angstrom sieves have also become known as Zeolite X and Zeolite Y. Zeolite X has been set out in U.S. Pat. No. 2,882,244 and Zeolite Y in U.S. Pat. No. 3,130,007. Zeolite X and Zeolite Y are tradename designations of the Linde Division of the Union Carbide Corporation, with Z-14 and Z-14 HS being tradename designations of the Davison Division of W. R. Grace & Company. These zeolite materials have found considerable use as adsorbents, components in petroleum cracking catalysts, in hydrocracking catalysts and in hydrotreating catalysts. As adsorbents, these zeolites are either used by themselves or in combination with clay binders. In use as cracking catalysts, these zeolites are usually exchanged with hydrogen, ammonia, rare earth or transition metal ions and incorporated into an oxidic matrix, usually a silica-alumina matrix, with or without a clay binder. The zeolite component in such catalysts usually comprise about 10 to 20 percent by weight of the total catalyst.

As noted above, Zeolite X and Zeolite Y are both essentially 10 angstrom crystalline molecular sieves. Principal differences between these sieves, however, are in the silica/alumina ratios and X-ray pattern. Zeolite X has a ratio in the range of about 2 up to 3, and Zeolite Y of from about 3 to 6. The general formula of sodium Zeolite X is $Na_2O: 2.5 + 0.5\ SiO_2: Al_2O_3: 1-8\ H_2O$ with the general formula of Zeolite Y being $Na_2O: 3-6\ SiO_2: Al_2O_3: 1-9\ H_2O$.

There are many prior art techniques for producing Zeolite X and Zeolite Y molecular sieves. One method comprises the addition of a caustic solution, and/or a silicate solution and/or an aluminate solution to meta-kaolin clay followed by the hydrothermal conversion of the meta-kaolin clay to the crystalline zeolite. Another method comprises the reaction of a silicate solution and an aluminate solution in reactant ratios effective to produce these zeolites. There also exist other methods which are too numerous to outline here. However, none of these techniques have used a sulfide route to produce ten angstrom molecular sieves. In this invention, I have discovered that Zeolite X and Zeolite Y (also known as Z-14 and Z-14 HS zeolites respectively) can be produced by using a sulfide such as sodium sulfide in place of at least part of the caustic component in producing crystalline zeolites. I have also discovered that ten angstrom crystalline molecular sieves can be very efficiently produced using a sodium sulfide nucleating mixture whereby the aging step can be eliminated. These sodium sulfide nucleating mixtures have been found to be very effective in promoting 10 angstrom zeolite production using the sulfide technique of this invention, as well as from conventional sodium aluminate and sodium silicate solutions, or in hydrothermal clay conversions.

It is, therefore, an object of this invention to set out a sulfide method for producing zeolite X and zeolite Y crystalline zeolitic molecular sieves.

It is additionally an object of this invention to set out a sulfide zeolite nucleating mixture and a method of producing this solution.

It is further an object of this invention to efficiently form zeolite X and zeolite Y crystalline zeolites by the addition of a sulfidic zeolite nucleating solution mixture to an aluminate and silicate solution mixture whereby massive numbers of nucleation centers are rapidly formed.

It is another object of this invention to produce zeolite X and zeolite Y crystalline zeolites by the addition of a sulfidic nucleating solution mixture to an aluminate, silicate and sulfide solution mixture whereby massive numbers of nucleation centers are rapidly formed.

In brief summary, my invention comprises the forming of ten angstrom crystalline zeolite molecular sieves by either of two embodiments. A first embodiment comprises forming these zeolites from aluminate and silicate solutions wherein a substantial part of the caustic component has been replaced by sodium sulfide. A second embodiment of this invention comprises the use of a sodium sulfide nucleating mixture to form nucleation centers in a conventional caustic sodium silicate and sodium aluminate reaction mixture, in the hydrothermal conversion of clay to zeolite, or in the formation of zeolites from a sulfidic solution wherein sodium sulfide replaces a substantial part of the caustic component in the sodium silicate and sodium aluminate reactant solutions.

In more detail, my invention comprises the preparation of zeolite X and zeolite Y zeolite molecular sieves by the partial substitution of sodium sulfide or sodium sulfide yielding material for caustic in the original reaction mixture to obtain buffering action in this mixture. These molecular sieves are very effectively produced by forming a sodium aluminate-sodium sulfide solution, followed by the addition of a sodium silicate solution to this mixture. The buffering action of the sodium sulfide provides the basicity required to dissolve the alumina hydrate component and maintain this component in solution, but is not of a basicity whereby zeolite crystallization is retarded. At high basicity levels, the zeolite nuclei are constantly being redissolved as they are formed thereby generally requiring long aging times to provide sufficient nuclei for effective crystallization. This invention solves this problem at least in part by utilizing both the basicity and buffering ability of the sulfide ion. While the hydroxyl ion is highly basic, it does not possess the buffering capability of the sulfide ion. A principal result of this property of the sulfide ion is that the 10 angstrom sieves produced have a more sharply defined X-ray structure and a higher surface area. The molecular ratios of components to effectively produce a Zeolite X is in the range of

| | |
|---|---|
| $SiO_2/Al_2O_3$ | 2.4–8 |
| $Na_2O/Al_2O_3$ | 2–8 |
| $Na_2O/Na_2S$ | 1–5 |
| $H_2O/Na_2O$ | greater than 15 | and the effective molecular ratios of components to produce Zeolite Y is in the range of

| | |
|---|---|
| SiO$_2$/Al$_2$O$_3$ | 3.5–20 |
| Na$_2$O/Al$_2$O$_3$ | 2–10 |
| Na$_2$O/Na$_2$S | 1–5 |
| H$_2$O/Na$_2$O | greater than 15 |

This combination is then mixed or otherwise converted to a homogenous state, aged and crystallized. The aging step is essentially allowing the mixture to stand at a temperature of 15° to 75°C and preferably about room temperature for from about 2 to 30 hours. During this aging, crystallization nuclei form so that the mixture can subsequently be crystallized. Crystallization comprises heating this aged solution mixture at from about 40 to 95°C for from 1 to 20 hours. During this heating, the zeolite crystals form and grow. The crystalline zeolite is then separated from the remaining liquor, washed, dried and activated.

A further embodiment of my invention comprises the adding of a sulfidic zeolite nucleating mixture to the above reaction mixture combination of sodium silicate, sodium aluminate and sodium sulfide. This nucleating mixture has the general formula 3–10 Na$_2$S:5–15 Na$_2$O:5–50 SiO$_2$:0.1–4.0 Al$_2$O$_3$:50–500 H$_2$O. This nucleating mixture is produced by admixing a sodium aluminate and a sodium sulfide solution followed by admixing a sodium silicate solution and incubating the resultant admixture. This nucleating mixture is added so as to be in a concentration of about 2 to 10 percent by weight of the reaction mixture. By the addition of this mixture, the aging step can be considerably decreased or even eliminated. Further in the crystallization step, the period of heating can be decreased to 0.5 to 4 hours. By the use of this nucleation mixture, nucleation centers are provided in the sodium aluminate, sodium silicate, sodium sulfide solution mixture. Therefore, since the function of the aging step is accomplished by this nucleation mixture, an aging is not required.

Another embodiment of my invention comprises the use of this sulfidic zeolite nucleating mixture with conventional sodium silicate and sodium aluminate mixtures so as to supply nucleation centers and thus promote crystalline zeolite formation.

The reaction mixtures generally used to form these 10 angstrom zeolites have the following molecular ratios of components:

| | |
|---|---|
| SiO$_2$/Al$_2$O$_3$ | 2.4–8 |
| Na$_2$O/Al$_2$O$_3$ | 2.5–8 |
| H$_2$O/Na$_2$O | greater than 15 | and

| | |
|---|---|
| SiO$_2$/Al$_2$O$_3$ | 3.5–20 |
| Na$_2$O/Al$_2$O$_3$ | 2.5–10 |
| H$_2$O/Na$_2$O | greater than 15 |

The sulfidic zeolite nucleating mixture is added to these reactant mixtures usually so as to be in a concentration of from about 2 to 10 percent by weight. After the mixing in of this sulfidic nucleating mixture, the combined may optionally be aged, but this is not a required step. If conducted, however, this is usually at 15° to 75°C for from .5 to 4 hours. The crystallization step consists of heating the mixture at about 40°–100°C for from 1 to 20 hours. After crystallization, the sieves are washed, dried and activated. These steps are conducted by any of the well-known art techniques.

It should be noted that there is no restriction that the nucleating mixture only be used in conjunction with silicate and aluminate solutions, with or without sodium sulfide. These nucleating solution mixtures may be effectively used in the hydrothermal conversion of clays to zeolites or in any other technique where an amorphous silica-alumina is converted to a crystalline zeolitic molecular sieve.

The following examples are set out to further amplify the present invention.

EXAMPLE I

This example sets out a method for producing molecular sieve crystallization nucleating mixtures containing substantial amounts of Na$_2$S. A solution containing 200 grams of Na$_2$S.9 H$_2$O, 85 grams of NaOH and 297 grams of H$_2$O was prepared and heated to 200°F. Then 26 grams of C-31 aluminum hydrate (65 percent Al$_2$O$_3$) was dissolved therein. After dissolving was completed, the solution was cooled to 100°F.

To the above Na$_2$S reactant mixture was added 685 grams of 28 percent Na$_2$SiO$_3$ solution with thorough mixing.

After the two solutions were well mixed, the resultant product was allowed to incubate at room temperature for 24 hours. The resultant mole ratio of the components are:

1 Al$_2$O$_3$ - 5.0 Na$_2$S - 10.7 Na$_2$O - 14.9 SiO$_2$ - 319 H$_2$O

EXAMPLE II

This example illustrates the formation of faujasite using the nucleating mixture of Example I.

A faujasite precursor slurry is formed by dissolving 53.1 g. of NaCH in 70 g. of H$_2$O, followed by the addition of 74 g. of C-31 alumina hydrate (65 percent Al$_2$O$_3$). This mixture is boiled until the alumina hydrate is dissolved. 220 g. of H$_2$O is then added, and the mix cooled to 100°F. This cooled solution is then added to 1,240 g. of 31.2° Be' sodium silicate (21.7 percent SiO$_2$, 6.7 percent Na$_2$O) with continuous stirring to assure a uniform slurry.

This faujasite precursor slurry is then divided into two equal portions and treated as follows:

Portion A - the slurry was heated to 210°–215°F and maintained at this temperature without stirring for 6 hours, quenched, filtered, water washed and dried at 1000°F for 1 hour Portion B - the slurry was activated by adding the molecular sieve nucleation mixture of Example 1 taking care to assure uniform dispersion of the nucleation centers throughout the slurry mass. The activated slurry was then heated to 210°–215°F and maintained at this temperature without stirring for 6 hours, quenched, filtered, well-water washed and dried at 1000°F for 1 hour.

The results are as follows:

| | Portion A | Portion B |
|---|---|---|
| | (as is slurry) | (sulfide nuclei activated) |
| X-ray Crystallinity | -amorphous | 83% of Zeolite Y |
| Cell Size | -amorphous | 24.21A |
| Surface Area | — | 626 M$^2$/g |

Thus, it is obvious that the sulfide molecular sieve nucleation centers energize the crystallization of the bulk faujasite slurry. The nuclei added in this experiment equaled 5 percent of the total mass on an Al$_2$O$_3$ basis (comparison of respective alumina contents).

EXAMPLE III

This example illustrates the use of sodium sulfide in place of part of the NaOH component in the formation of zeolite X. The runs I, II and III further illustrate that the sodium sulfide content can be varied.

240 grams of sodium sulfide ($Na_2S.9\ H_2O$) was dissolved in 312 ml. of $H_2O$. 157 grams of alumina hydrate was then dissolved in this sodium sulfide solution. 373 grams of 50 percent NaOH was then added. This solution was diluted with 976 ml. of $H_2O$ and cooled. This is designated as solution A.

664 grams of 40° Be sodium silicate is diluted with 1244 ml. of $H_2O$. This is designated Solution B. Solutions A and B are mixed to form a molecular sieve reactant precursor slurry.

This slurry is aged 22 hours at room temperature, and heated for 12 hours at 200°–212°F to cause crystallization. This slurry is then filtered and water washed to a pH of 10.5–11.

336 grams of sodium sulfide ($Na_2S.9\ H_2O$) was dissolved in 478 ml. of water. 157 grams of C-31 alumina was then dissolved in this sodium sulfide solution. 310 grams of 50 percent NaOH was then added. This solution was diluted with 810 ml. of $H_2O$ and cooled. This is designated as solution A.

664 grams of 40°Be sodium silicate was diluted with 1244 ml. $H_2O$. This is designated Solution B. Solutions A and B are mixed to form a molecular sieve reactant precursor slurry.

This slurry is aged 22 hours at room temperature, and heated for 12 hours at 200°–212°F to cause crystallization.

This slurry is then filtered and water washed to a pH of 10.5–11.

157 grams of C-31 Alumina was dissolved in 535 grams of 50 percent NaOH. 1288 ml. of $H_2O$ were added and the solution cooled.

This is designated Solution A.

664 grams of 40° Be sodium silicate is diluted with 1244 ml. $H_2O$. This is designated Solution B. Solution A is mixed with Solution B to form a molecular sieve reactant precursor slurry.

This slurry is aged 22 hours at room temperature and heated for 12 hours at 200°–212°F to cause crystallization. This slurry it then filtered and water washed to a pH of 10.5–11.

The data and results are reported in Table 1.

Table I

| Run | I | II | III |
|---|---|---|---|
| Reaction Mole Ratio | | | |
| $Al_2O$ | 1.0 | 1.0 | 1.0 |
| $SiO_2$ | 3.1 | 3.1 | 3.1 |
| $Na_2O$ | 3.3 | 2.9 | 4.3 |
| $Na_2S$ | 1.0 | 1.4 | |
| $H_2O$ | 189 | 190 | 185 |
| X-Ray Crystallinity | | | |
| Percent of standard | 130 | 125 | 112 |
| Surface Area $M^2/g$ | 841 | 769 | 673 |

What is claimed is:

1. A method for producing faujasite zeolite compositions comprising:
   a. forming a reactant admixture having essentially the molecular formulation

| | |
   |---|---|
   | $SiO_2/Al_2O_3$ | 2.4–20 |
   | $Na_2O/Al_2O_3$ | 2–10 |
   | $Na_2O/Na_2S$ | 1–5 |
   | $H_2O/Na_2O$ | greater than 15 | b. aging said formulation at about 15° to 75°C for from 2 to 30 hours,
   c. heating said aged formulation at from 40° to 100°C for from 1 to 20 hours to effect crystallization, and
   d. recovering faujasite zeolite.

2. A method as in claim 1 wherein a zeolite nucleating mixture consisting essentially of 3–10 $Na_2S$:5–15 $Na_2O$:5–50 $SiO_2$:0.1–4.0 $Al_2O_3$:50–500 $H_2O$ is dispersed within said reactant admixture and said aging step is deleted.

3. A method as in claim 2 wherein said zeolite nucleating mixture consists essentially of 5.0 $Na_2S$:10.7 $Na_2O$:14.9 $SiO_2$:$Al_2O_3$:319 $H_2O$.

4. A method as in claim 2 wherein the molecular formulation of said admixture effective to produce zeolite X is in the range of

| | |
   |---|---|
   | $SiO_2/Al_2O_3$ | 2.4–8 |
   | $Na_2O/Al_2O_3$ | 2–8 |
   | $Na_2O/Na_2S$ | 1–5 |
   | $H_2O/Na_2O$ | greater than 15. |

5. A method as in claim 2 wherein the molecular formulation of said admixture effective to produce zeolite Y is in the range of

| | |
   |---|---|
   | $SiO_2/Al_2O_3$ | 3.5–20 |
   | $Na_2O/Al_2O_3$ | 2–10 |
   | $Na_2O/Na_2S$ | 1–5 |
   | $H_2O/Na_2O$ | greater than 15. |

* * * * *